(12) United States Patent
Chatterjea

(10) Patent No.: US 7,634,909 B1
(45) Date of Patent: Dec. 22, 2009

(54) ARTICULATED LOADER STEERING SYSTEM

(76) Inventor: Probir Chatterjea, 211 Danen La., Sleepy Hollow, IL (US) 60118

( * ) Notice: Subject to any disclaimer, the term of this patent is extended or adjusted under 35 U.S.C. 154(b) by 628 days.

(21) Appl. No.: 11/433,522

(22) Filed: May 12, 2006

Related U.S. Application Data

(60) Provisional application No. 60/680,743, filed on May 13, 2005.

(51) Int. Cl.
  F15B 15/00    (2006.01)
  B62D 5/09     (2006.01)
(52) U.S. Cl. .................... 60/338; 60/469; 180/442; 280/89
(58) Field of Classification Search .............. 60/338, 60/413, 416, 469; 180/442; 280/89, 90
  See application file for complete search history.

(56) References Cited

U.S. PATENT DOCUMENTS

| | | | | |
|---|---|---|---|---|
| 3,893,377 A | * | 7/1975 | Mannetje | 60/416 |
| 4,405,030 A | * | 9/1983 | Wittren | 60/385 |
| 4,640,094 A | * | 2/1987 | Wittren | 60/385 |
| 4,940,106 A | * | 7/1990 | Pedersen et al. | 60/338 |
| 4,949,802 A | * | 8/1990 | Gage | 60/413 |
| 6,655,492 B2 | * | 12/2003 | Juul et al. | 180/442 |
| 7,243,494 B2 | * | 7/2007 | Evans | 60/469 |

* cited by examiner

*Primary Examiner*—Thomas E Lazo
(74) *Attorney, Agent, or Firm*—Jovan N. Jovanovic; Vladan M. Vasiljevic; The Watson I.P. Group, PLC

(57) ABSTRACT

A travel jolt minimizing assembly for use in association with an articulated loader steering environment having a orbitrol pump, and a flow amplifier coupled to the orbitrol pump through a left orbitrol signal and a right orbitrol signal, and a steering cylinder coupled to the flow amplifier. The travel jolt minimizing assembly includes a system for temporarily diverting the left orbitrol signal within a predetermined degrees of a full articulation in a left direction and a system for temporarily diverting the right orbitrol signal within a predetermined degrees of a full articulation in a right direction. The invention further includes a response cushion assembly which minimizes jolts which occur upon a rapid change in direction.

11 Claims, 4 Drawing Sheets

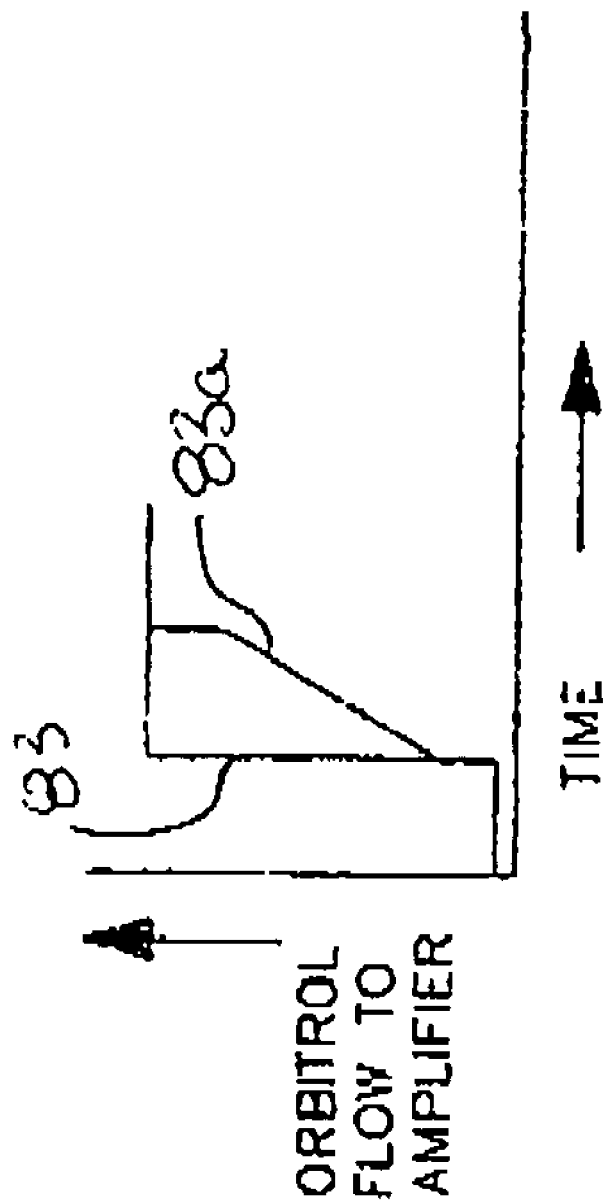

ARTICULATED LOADER STEERING SYSTEM

CROSS-REFERENCE TO RELATED APPLICATION

This application claims priority from U.S. Provisional Patent Application 60/680,743 filed May 13, 2005, entitled "Articulated Loader Steering System," the entire specification of which is incorporated by reference.

BACKGROUND OF THE INVENTION

1. Field of the Invention

The present invention relates in general to steering systems of rubber tire loaders, and more particularly to an articulated loader steering system which minimizes the jolt experienced by the driver of an articulating rubber tire loader at the end of steering travel and/or upon a quick change in direction. The invention is not limited to rubber tire loaders, but may be applied to other articulating construction equipment, or otherwise.

2. Background Art

Generally, rubber tired loaders include an articulation point between the front portion of the body and the back portion of the body. The bucket is a part of the front portion and the engine is generally part of the back portion. Depending on the configuration, the cab may be associated with the front portion or the back portion.

With such loaders, a hydraulic system is utilized to articulate the front portion relative to the back portion about an articulation hinge. The hinge generally permits a rotation of about 40°. One problem that has been experienced is that as the end of the rotational travel is reached, the driver experiences a jolt through the steering system. Additionally, jerks and disruptions are observed when a driver makes a quick change in direction. Both situations are often uncomfortable to the driver. Additionally, it may pose a hazard, as the driver may be distracted.

Certain solutions have been developed. For example, as the end of the travel is reached, the steering wheel can be decoupled, for example, hydraulically from the steering articulation cylinder. In such a configuration, continued turning of the wheel does not result in any additional movement of the cylinder. While this overcomes the jolt experienced by the driver, a new problem is created. Specifically, the driver is left with feeling that the steering wheel no longer functions. The feel does not return to the wheel until it is articulated in the opposite direction. Such a configuration can be quite unnerving to the driver.

Thus, it is an object to minimize any hydraulic jolt experienced by the driver of an articulated loader as the end of articulation is reached.

It is another object of the invention to minimize the hydraulic jolt experienced by the driver of an articulated loader without the driver recognizing any loss in control of the loader.

It is another object of the invention to minimize a hydraulic jolt experienced by the driver of an articulated loader as the loader These and other objects of the invention will become apparent in light of the specification and claims appended hereto.

BRIEF DESCRIPTION OF THE DRAWINGS

The invention will now be described with reference to the drawings wherein:

FIG. 4 of the drawings comprises a graphical plot of the orbitrol signal as supplied to the amplifier relative to time.

SUMMARY OF THE INVENTION

Figure 1:
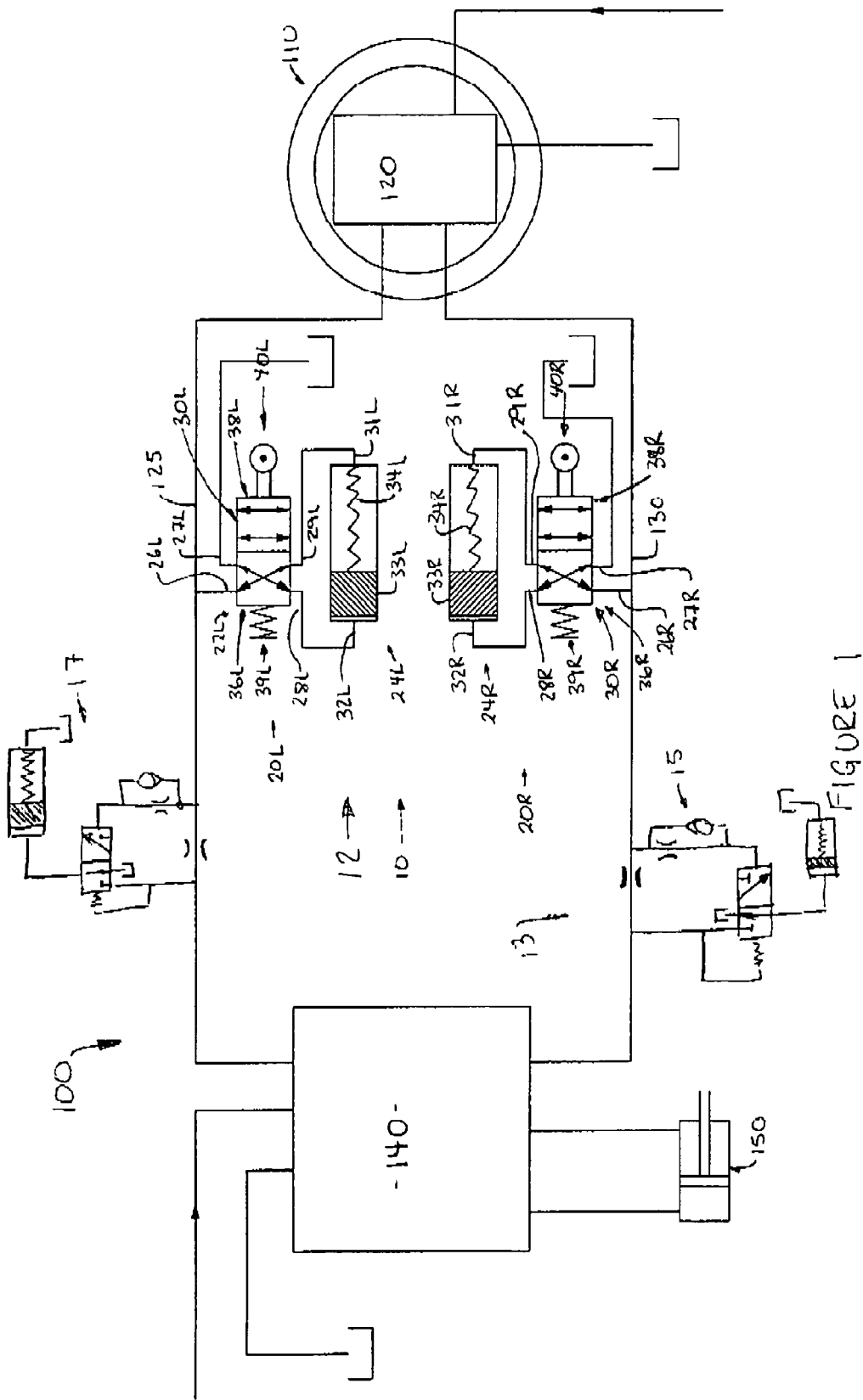
FIG. 1 of the drawings comprises a schematic representation of the articulated loader steering system positioned in the steering system of a loader.

The invention comprises a travel jolt minimizing assembly for use in association with an articulated loader steering environment having a orbitrol pump, and a flow amplifier coupled to the orbitrol pump through a left orbitrol signal and a right orbitrol signal, and a steering cylinder coupled to the flow amplifier. The travel jolt minimizing assembly comprises means for temporarily diverting the left orbitrol signal within a predetermined degrees of a full articulation in a left direction and means for temporarily diverting the right orbitrol signal within a predetermined degrees of a full articulation in a right direction.

In a preferred embodiment, the right temporary diverting means further comprises a shuttle valve and a switch valve. The shuttle valve includes a diversion spool and a head end port. The diversion spool is biased toward the head end port. The switch valve is coupled to each of the shuttle valve and the right orbitrol signal. The switch valve has a first position and a second position. The first position corresponds to a position wherein the right orbitrol signal is isolated from the switch valve. The second position corresponds to a position wherein the right orbitrol signal is in fluid communication with the head end port of the shuttle valve. Actuation of the switch valve from the first position to a second position diverts fluid from the right orbitrol signal into the shuttle valve, driving the diversion spool across the valve away from the head end port toward an end of travel.

In another preferred embodiment, the left temporary diverting means further comprises a shuttle valve and a switch valve. The shuttle valve has a diversion spool and a head end port. The diversion spool is biased toward the head end port. The switch valve is coupled to each of the shuttle valve and the left orbitrol signal. The switch valve has a first position and a second position. The first position corresponds to a position wherein the left orbitrol signal is isolated from the switch valve. The second position corresponds to a position wherein the left orbitrol signal is in communication with the head end port of the shuttle valve. Actuation of the switch valve from the first position to a second position diverts fluid from the left orbitrol signal into the shuttle valve, driving the diversion spool across the valve away from the head end port toward an end of travel.

In a preferred embodiment, the movement from the head end port to the end of travel for the diversion spool for each of the right temporary diverting means and the left temporary diverting means takes approximately less than 1 second. In another preferred embodiment, actuation of the switch valve for each of the right and left temporary diverting means occurs in approximately the last 5° of articulation in the respective right and left directions.

In another aspect of the invention, the invention comprises a response cushion assembly. The assembly comprises means for detecting a rapid change in fluid flow in each of a right orbitrol signal and a left orbitrol signal, means for diverting fluid to a right accumulator for a predetermined period of time in response to the detecting of the detecting means of a rapid change in fluid flow, and means for diverting fluid to a left accumulator for a predetermined period of time in response to the detecting of the detecting means of a rapid change in fluid flow.

In a preferred embodiment, the detecting means comprises a steering wheel speed and direction sensor.

In another preferred embodiment, the detecting means comprises a flow sensing orifice positioned in each of the right and left orbitrol signals.

In yet another embodiment, the right accumulator diverting means comprises an isolator valve and an accumulator. The isolator valve includes a spool, a head end port, a first port, a second port and a third port. The accumulator has a head end port, a spool and means for biasing the spool toward the head end port. The isolator valve has a first position wherein the first port of the isolator valve is in fluid communication with the third port of the isolator valve, the first port of the isolator valve is in fluid communication with the head end of the accumulator, the third port of the isolator valve is in fluid communication with a tank. Additionally, the isolator valve has a second position wherein the first port of the isolator valve is in fluid communication with the third port of the isolator valve, the first port of the isolator valve is in fluid communication with the head end of the accumulator, the third port of the isolator valve is in fluid communication with the orbitrol signal. The head end port of the isolator valve is in fluid communication with the right orbitrol signal. In another embodiment, the left accumulator diverting means is identical to the right accumulator diverting means.

In a preferred embodiment, the assembly further includes a check valve and an orifice positioned in parallel between the right orbitrol signal and the head end port of the isolator valve. The check valve permits flow from the right orbitrol signal to the to the head end port of the isolator valve, while precluding flow in a reverse direction, thereby directing fluid from the head end port of the isolator valve to the right orbitrol signal through the orifice.

The invention further comprises a method of minimizing jolt of a driver in an articulating loader having an articulated loader steering environment that includes an orbitrol pump, and a flow amplifier coupled to the orbitrol pump through a left orbitrol signal and a right orbitrol signal, and a steering cylinder coupled to the flow amplifier. The method comprises the steps of: temporarily diverting the left orbitrol signal when the driver turns to the left and reaches within a predetermined number of degrees from full articulation in the left direction; and temporarily diverting the right orbitrol signal when the driver turns to the right and reaches within a predetermined number of degrees from full articulation in the right direction.

In a preferred embodiment, the method further includes the steps of detecting a rapid change in fluid flow in each of a right orbitrol signal and a left orbitrol signal; diverting fluid to a right accumulator for a predetermined period of time in response to the detecting a rapid change in fluid flow in the right orbitrol signal; and diverting fluid to a left accumulator for a predetermined period of time in response to the detecting of a rapid change in fluid flow in the left orbitrol signal.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a schematic representation of an articulated loader steering environment 100 having articulated loader steering system 10. Typically, the system includes steering wheel 110, orbitrol pump 120, left orbitrol signal 125, right orbitrol signal 130, flow amplifier 140 and steering cylinder 150. By way of the steering wheel manipulation by the driver of the loader, the orbitrol pump may be directed to transmit a signal (i.e., fluid) to either of the left orbitrol signal or to the right orbitrol signal. In turn, the flow amplifier amplifies this signal and directs the steering cylinder in a proper direction. Problematically, (without the articulated loader steering system 10) as the articulated loader steering system reaches the end of travel (generally the articulation is approximately 40° in either direction about the articulation hinge), an undesirable jolt is felt by the driver. Additionally, jolts can be felt by a driver after a rather rapid change in direction.

To combat such a jolt and to cushion the end of travel of the articulation, and/or at in response to a rather rapid change of direction articulated loader steering system 10 is utilized. The steering system includes travel jolt minimizing assembly 12 and response cushion assembly 13. It will be understood that the travel jolt minimizing assembly 12 and the response cushion assembly 13 may be utilized in conjunction with each other. It is also contemplated that the two assemblies may be utilized separately (i.e., an assembly may have either one assembly or both assemblies).

The travel jolt minimizing assembly includes means for temporarily diverting the left orbitrol signal within a predetermined degrees of a full articulation in a left direction and means for temporarily diverting the right orbitrol signal within a predetermined degrees of a full articulation in a right direction. One such temporary diverting means in the left direction comprises left valve assembly 20L and one such temporary diverting means in the right direction comprises right valve assembly 20R. The particular configuration of each of the right and left valve assemblies can be modified within the scope of the present invention.

The left valve assembly 20L includes switch valve 22L and shuttle valve 24L. Switch valve 22L includes first input port 26L, second input port 27L, first output port 28L, second output port 29L and spool 30L. Spool 30L includes a first port position 36L, second port position 38L and means 39L for biasing the spool into the first port position. Shuttle valve 24L is shown in FIG. 1 as comprising head end port 31L, tail end port 32L, spool 33L and means 34L for biasing the spool of the shuttle valve against the tail end port.

First input port 26L of the switch valve is in fluid communication with left orbitrol signal 125. Second input port 27L of the switch valve is in fluid communication with the return tank. The first output port 28L is in fluid communication with tail end port 32L of shuttle valve 24L. The second output port 29L is in fluid communication with head end port 31L of shuttle valve 24L.

Initially, spool 30L is positioned such that it is in the first port position 36L. In such a position, first input port 26L is in fluid communication with second output port 29L and second input port 27L is placed in fluid communication with first output port 28L. As the user turns to the left, the top end of the spool is contacted and the force 40L is imparted on spool 30L. Generally, the spool begins to move at about 5° prior to the end of rotation of the articulated loader about the hinge.

As the articulation continues, spool 30L is directed to the second position. In the second position, first input port 26L is in fluid communication with first output port 28L. Additionally, second input port 27L is in fluid communication with second output port 29L. In such a configuration, the orbitrol signal is diverted through spool 30L into tail end port 32L (as the fluid is directed toward the low pressure of the tail end port). The diversion moves spool 33L toward the head end port. Once the spool reaches the end of travel, no additional orbitrol signal can be diverted, and the remaining signal once again proceeds to the flow amplifier.

Depending on the design of the shuttle valve, a desired time period of diversion can be altered. In the present embodiment, it is contemplated that the travel of the spool from the initial position to the end of travel will comprise approximately 0.3 seconds. Once the fluid from the orbitrol signal is again directed to the flow amplifier, the ability of the system to generate a jolt is eliminated. Moreover, inasmuch as the diversion is generally less than a second, the driver does not notice that his movement of the steering wheel for that time period is not translated to the flow amplifier, and in turn the steering cylinder.

As the user articulates the loader away from the left, spool 30L of the switch valve 22L is returned to the first port position 36L by biasing means 39L. In such an orientation, the tail end port 32L of shuttle valve 24L is placed in communication with the tank. The biasing means 34L of the shuttle valve 24L then forces spool 33L back to the tail end port of the shuttle valve.

The right valve assembly 20R is substantially identical to the left valve assembly. In particular, the right valve assembly 20R includes switch valve 22R and shuttle valve 24R. Switch valve 22R includes first input port 26R, second input port 27R, first output port 28R, second output port 29R and spool 30R. Spool 30R includes a first port position 36R, second port position 38R and means 39R for biasing the spool into the first port position. Shuttle valve 24R is shown in FIG. 1 as comprising head end port 31R, tail end port 32R, spool 33R and means 34R for biasing the spool of the shuttle valve against the tail end port.

First input port 26R of the switch valve is in fluid communication with right orbitrol signal 130. Second input port 27R of the switch valve is in fluid communication with the return tank. The first output port 28R is in fluid communication with tail end port 32R of shuttle valve 24R. The second output port 29R is in fluid communication with head end port 31R of shuttle valve 24R.

Initially, spool 30R is positioned such that it is in the first port position 36R. In such a position, first input port 26R is in fluid communication with second output port 29R and second input port 27R is placed in fluid communication with first output port 28R. As the user turns to the right, the top end of the spool is contacted and the force 40R is imported on spool 30R. Generally, the spool begins to move at about 5° prior to the end of rotation of the articulated loader about the hinge.

As the articulation continues, spool 30R is directed to the second position. In the second position, first input port 26R is in fluid communication with first output port 28R. Additionally, second input port 27R is in fluid communication with second output port 29R. In such a configuration, the orbitrol signal is diverted through spool 30R into tail end port 32R (as the fluid is directed toward the low pressure of the tail end port). The diversion moves spool 33R toward the head end port. Once the spool reaches the end of travel, no additional orbitrol signal can be diverted, and the remaining signal once again proceeds to the flow amplifier.

Depending on the design of the shuttle valve, a desired time period of diversion can be altered. In the present embodiment, it is contemplated that the travel of the spool from the initial position to the end of travel will comprise approximately 0.3 seconds. Once the fluid from the orbitrol signal is again directed to the flow amplifier, the ability of the system to generate a jolt is eliminated. Moreover, inasmuch as the diversion is generally less than a second, the driver does not notice that his movement of the steering wheel for that time period is not translated to the flow amplifier, and in turn the steering cylinder.

As the user articulates the loader away from the right, spool 30R of the switch valve 22R is returned to the first port position 36R by biasing means 39R. In such an orientation, the tail end port 32R of shuttle valve 24R is placed in communication with the tank. The biasing means 34R of the shuttle valve 24R then forces spool 33R back to the tail end port of the shuttle valve.

It will be understood that in the embodiment shown, either the right switch valve or the left switch valve will be moving at any given time, and in certain configurations, both switch valves will be in the first position (i.e., when traveling in a straight line or when articulated less than, for example 35° in either direction). Furthermore, it will be understood that while the system is configured for activation across the last 5° of rotation, a greater or lesser activation window is contemplated. Moreover, while it is contemplated that the shuttle spools will reach the end of their respective travel in less than approximately 1 second, and more preferably, approximately 0.3 seconds, this may be varied by increasing, for example, the distance between the tail end of the valve and the end of travel.

It will be understood that such an operation can be achieved from a number of different configurations of the left and right valve assemblies 20L, 20R. Advantageously, the left valve assembly and the right valve assembly can be unitized into a single housing. The housing can be positioned close to the articulated joint with valves on either side of the centerline of the vehicle, such that components on the joint interface with the various spools upon the desired articulation.

Figure 2:
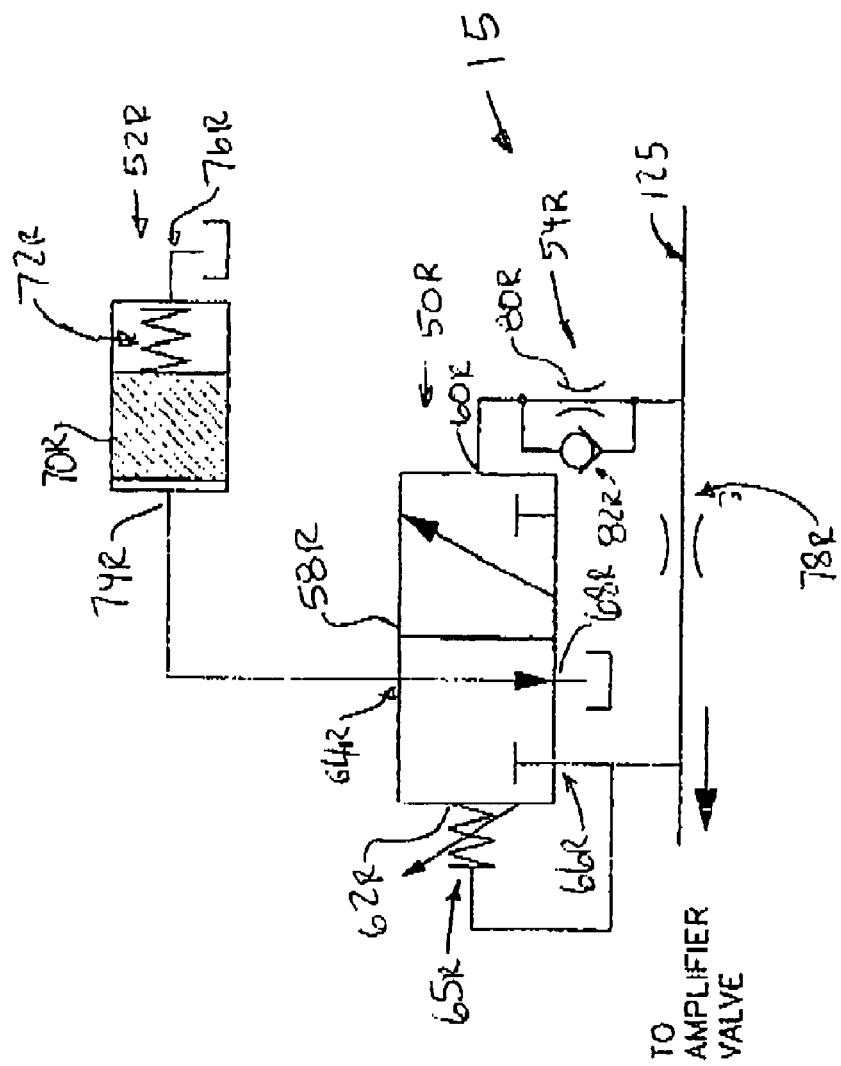
FIG. 2 of the drawings comprises a schematic representation of the right assembly of the response cushion assembly of the present invention.

Response cushion assembly 13 is shown in FIGS. 1 and 2 as comprising right subassembly 15 and left subassembly 17. The right subassembly 15 is shown in greater detail in FIG. 2, and will be described with the understanding that left subassembly 17 is substantially identical. In particular, the right assembly comprises isolator valve 50R, accumulator 52R and spool directing system 54R. Isolator valve 50R includes spool 58R, head end port 60R, tail end port 62R, first port 64R, second port 66R and third port 68R. Head end port 60R is coupled to the orbitrol signal 125. Tail end port is coupled to the orbitrol signal and includes an adjustable return spring 65R. Specifically, the isolator valve essentially comprises one embodiment of a means for diverting fluid to a right accumulator for a predetermined period of time in response to the detecting of the detecting means of a rapid change in fluid flow.

Accumulator 52R includes spool 70R, biasing means 72R, head end port 74R, and tail end port 76R. The head end port 74R is coupled to the first port 64R of the isolator valve 50R. The tail end port 76R is coupled to the tank (low pressure). Biasing means 72R forces spool 70R toward head end port 74R.

Spool directing system 54R comprises flow sensing orifice 78R positioned in the orbitrol signal 125, diverting orifice 80R and check valve 82R. The check valve 82R is positioned in parallel with diverting orifice 80R both of which are positioned between the orbitrol signal and tail end port 62R. The check valve 82R is positioned such that flow is permitted across the check valve (at a pressure greater than the check valve rating) to the tail end port 62R, but not from the tail end port 62R to the orbitrol signal. The spool directing system essentially comprises an embodiment of a means for detecting a rapid change in fluid flow in a right orbitrol signal.

The isolator valve 50R has a first position and a second position. In a first position, first port 64R communicates with head end port 74R of accumulator 52R. The second port 66R is blocked. And the third port 68R communicates with the tank (or source of low pressure. Furthermore, the first port and the third port are in fluid communication. As such, the head end port 74R of accumulator 52R communicates with the tank.

In a second position, the first port 64R is placed in fluid communication with the second port 66R and the third port 68R is isolated and placed in communication with the tank. As such, the orbitrol signal is place in fluid communication with head end port 74R. In operation, the isolator valve is typically in the first position. Upon a sudden turn or change in direction, the flow through the orbitrol signal greatly changes. The increased flow backs up behind the flow sensing orifice 78R. As such, the flow is diverted through check valve 82R, thereby directing the isolator valve from the first position into the second position. In the second position, the orbitrol signal downstream of the flow sensing orifice 78R is directed through the communication of the first port 64R and second port 66R of the isolator valve 50R to head end port 74R of the accumulator 52R. As such, the increased fluid drives the spool 70R toward the head end port. In such a condition, flow to the amplifier valve is reduced due to the diversion of some of the fluid to the accumulator.

As the fluid equalizes on either side of the flow sensing orifice (or as the difference is reduced to a certain predetermined difference, such as, for example 50 psi), the fluid is no longer being directed through the check valve 82R and the check valve closes. Spring 65R overcomes the fluid pressure at the head end port 60R, and the fluid returns through diverting orifice 80R. Orifice 80R insures that the return of the isolator valve is quite gradual, and the particular size of the opening can be varied to achieve the desired rate of return for the isolator valve.

Once the isolator valve returns to the first position, the fluid within the accumulator is forced out through the head end port by biasing means 72R of accumulator 52R into the tank. It will be understood that relatively slower steering will not shift the valve from the first position to the second position. The difference required to alter the position of the valve is related to the rating of the spring on the tail end port.

Figure 3:
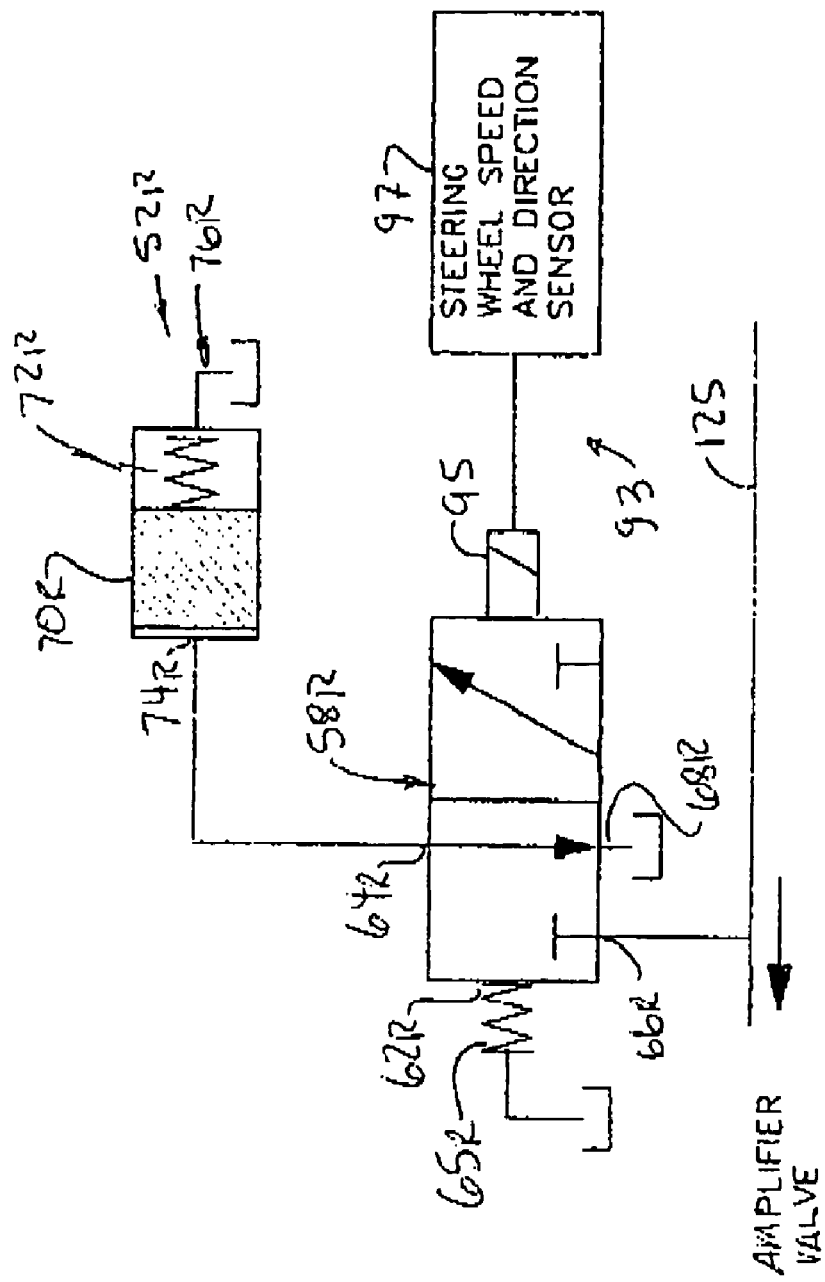
FIG. 3 of the drawings comprises a schematic representation of an alternate embodiment of the right assembly of the response cushion assembly of the present invention.

In an alternate embodiment, shown in FIG. 3, the means for detecting may comprise an electrical/electronic member 93 for directing the movement of the isolator valve. Specifically, a solenoid 95 can be selectively activated based upon readings taken from a steering wheel speed and direction sensor 97. Other means of activation of the isolator valve are contemplated, including mechanical activation, hydraulic activation and electric/electronic activation.

With reference to FIG. 4, a graph is shown which demonstrates the differences between a system having a response cushion assembly and a system lacking such a system. In particular, the line 83 represents a plot of time versus orbitrol flow to the amplifier. As can be seen, at a time of dramatic change in direction, there is an almost instantaneous increase in the flow to the amplifier (leading to a jerking or disruptive motion). Conversely, with the present invention, the line 83a represents the gradual flow increase that is experienced with an identical rapid change in direction. As such, minimal jerking and/or disruptive motion due to the hydraulics is experienced.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A travel jolt minimizing assembly for use in association with an articulated loader steering environment having a orbitrol pump, and a flow amplifier coupled to the orbitrol pump through a left orbitrol signal and a right orbitrol signal, and a steering cylinder coupled to the flow amplifier, the travel jolt minimizing assembly comprising:

means for temporarily diverting the left orbitrol signal within a predetermined degrees of a full articulation in a left direction; and means for temporarily diverting the right orbitrol signal within a predetermined degrees of a full articulation in a right direction, wherein the left temporary diverting means further comprises:

a shuttle valve having a diversion spool and a head end port, the diversion spool is biased toward the head end port;

a switch valve coupled to each of the shuttle valve and the left orbitrol signal, the switch valve having a first position and a second position, the first position corresponding to a position wherein the left orbitrol signal is isolated from the switch valve and the second position corresponding to a position wherein the left orbitrol signal is in communication with the head end port of the shuttle valve, whereupon actuation of the switch valve from the first position to a second position diverts fluid from the left orbitrol signal into the shuttle valve, driving the diversion spool across the valve away from the head end port toward an end of travel.

2. The assembly of claim 1 wherein the right temporary diverting means further comprises:

a shuttle valve having a diversion spool and a head end port, the diversion spool is biased toward the head end port;

a switch valve coupled to each of the shuttle valve and the right orbitrol signal, the switch valve having a first position and a second position, the first position corresponding to a position wherein the right orbitrol signal is isolated from the switch valve and the second position corresponding to a position wherein the right orbitrol signal is in communication with the head end port of the shuttle valve, whereupon actuation of the switch valve from the first position to a second position diverts fluid from the right orbitrol signal into the shuttle valve, driving the diversion spool across the valve away from the head end port toward an end of travel.

3. The assembly of claim 2 wherein the movement from the head end port to the end of travel for the diversion spool for each of the right temporary diverting means and the left temporary diverting means takes approximately less than 1 second.

4. The assembly of claim 1 wherein actuation of the switch valve for each of the right and left temporary diverting means occurs in approximately the last 5° of articulation in the respective right and left directions.

5. A response cushion assembly comprising:
   means for detecting a rapid change in fluid flow in each of a right orbitrol signal and a left orbitrol signal;
   means for diverting fluid to a right accumulator for a predetermined period of time in response to the detecting of the detecting means of a rapid change in fluid flow; and
   means for diverting fluid to a left accumulator for a predetermined period of time in response to the detecting of the detecting means of a rapid change in fluid flow, wherein:
   the detecting means comprises a steering wheel speed and direction sensor.

6. A response cushion assembly comprising:
   means for detecting a rapid change in fluid flow in each of a right orbitrol signal and a left orbitrol signal;
   means for diverting fluid to a right accumulator for a predetermined period of time in response to the detecting of the detecting means of a rapid change in fluid flow; and
   means for diverting fluid to a left accumulator for a predetermined period of time in response to the detecting of the detecting means of a rapid change in fluid flow, wherein the detecting means comprises a flow sensing orifice positioned in each of the right and left orbitrol signals.

7. A response cushion assembly comprising:
   means for detecting a rapid change in fluid flow in each of a right orbitrol signal and a left orbitrol signal;
   means for diverting fluid to a right accumulator for a predetermined period of time in response to the detecting of the detecting means of a rapid change in fluid flow; and
   means for diverting fluid to a left accumulator for a predetermined period of time in response to the detecting of the detecting means of a rapid change in fluid flow, wherein the right accumulator diverting means comprises:
   an isolator valve having a spool, a head end port, a first port, a second port and a third port;
   an accumulator having a head end port, a spool and means for biasing the spool toward the head end port,
   the isolator valve having a first position wherein the first port of the isolator valve is in fluid communication with the third port of the isolator valve, the first port of the isolator valve is in fluid communication with the head end of the accumulator, the third port of the isolator valve is in fluid communication with a tank, and a second position wherein the first port of the isolator valve is in fluid communication with the third port of the isolator valve, the first port of the isolator valve is in fluid communication with the head end of the accumulator, the third port of the isolator valve is in fluid communication with the orbitrol signal, the head end port of the isolator valve is in fluid communication with the right orbitrol signal.

8. The assembly according to claim 7 further comprising a check valve and an orifice positioned in parallel between the right orbitrol signal and the head end port of the isolator valve, the check valve permitting flow from the right orbitrol signal to the to the head end port of the isolator valve, while precluding flow in a reverse direction, thereby directing fluid from the head end port of the isolator valve to the right orbitrol signal through the orifice.

9. The assembly according to claim 7 wherein the left accumulator diverting means comprises:
   an isolator valve having a spool, a head end port, a first port, a second port and a third port;
   an accumulator having a head end port, a spool and means for biasing the spool toward the head end port,
   the isolator valve having a first position wherein the first port of the isolator valve is in fluid communication with the third port of the isolator valve, the first port of the isolator valve is in fluid communication with the head end of the accumulator, the third port of the isolator valve is in fluid communication with a tank, and a second position wherein the first port of the isolator valve is in fluid communication with the third port of the isolator valve, the first port of the isolator valve is in fluid communication with the head end of the accumulator, the third port of the isolator valve is in fluid communication with the orbitrol signal, the head end port of the isolator valve is in fluid communication with the right orbitrol signal.

10. The assembly according to claim 9 further comprising a check valve and an orifice positioned in parallel between the left orbitrol signal and the head end port of the isolator valve, the check valve permitting flow from the left orbitrol signal to the to the head end port of the isolator valve, while precluding flow in a reverse direction, thereby directing fluid from the head end port of the isolator valve to the left orbitrol signal through the orifice.

11. A method of minimizing jolt of a driver in an articulating loader having an articulated loader steering environment that includes an orbitrol pump, and a flow amplifier coupled to the orbitrol pump through a left orbitrol signal and a right orbitrol signal, and a steering cylinder coupled to the flow amplifier, comprising the steps of:
   temporarily diverting the left orbitrol signal when the driver turns to the left and reaches within a predetermined number of degrees from full articulation in the left direction; and
   temporarily diverting the right orbitrol signal when the driver turns to the right and reaches within a predetermined number of degrees from full articulation in the right direction;
   detecting a rapid change in fluid flow in each of a right orbitrol signal and a left orbitrol signal;
   diverting fluid to a right accumulator for a predetermined period of time in response to the detecting a rapid change in fluid flow in the right orbitrol signal; and
   diverting fluid to a left accumulator for a predetermined period of time in response to the detecting of a rapid change in fluid flow in the left orbitrol signal.

* * * * *